(12) United States Patent
Amberg et al.

(10) Patent No.: US 11,377,206 B2
(45) Date of Patent: Jul. 5, 2022

(54) TORQUE LINK APEX QUICK RELEASE LOCKING MECHANISM

(71) Applicant: Safran Landing Systems Canada Inc., Ajax (CA)

(72) Inventors: Steven Amberg, Toronto (CA); Randy Lee, Oshawa (CA); Zoran Pasic, Toronto (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 1068 days.

(21) Appl. No.: 15/934,502

(22) Filed: Mar. 23, 2018

(65) Prior Publication Data

US 2019/0291854 A1 Sep. 26, 2019

(51) Int. Cl.
*B64C 25/60* (2006.01)
*B64C 25/50* (2006.01)
(Continued)

(52) U.S. Cl.
CPC ............ *B64C 25/50* (2013.01); *B64C 25/001* (2013.01); *B64C 25/14* (2013.01); *B64C 25/26* (2013.01); *F16B 21/00* (2013.01); *F16C 11/02* (2013.01); *B64C 25/60* (2013.01); *B64C 2025/006* (2013.01); *F16C 11/045* (2013.01);
(Continued)

(58) Field of Classification Search
CPC . B64C 25/60; B64C 2025/006; F16C 11/045; Y10T 403/32918; Y10T 403/599; Y10T 403/591; Y10T 403/597; Y10T 403/7005
See application file for complete search history.

(56) References Cited

U.S. PATENT DOCUMENTS 2,279,447 A 4/1942 Cowey
2,487,329 A 11/1949 Gerry
(Continued)

FOREIGN PATENT DOCUMENTS

GB 356845 A 9/1931
WO 2012/054360 A2 4/2012

OTHER PUBLICATIONS

Extended European Search Report dated Aug. 8, 2019, issued in corresponding European Application No. 19164222.2 filed Mar. 21, 2019, 6 pages.

*Primary Examiner* — Michael P Ferguson
(74) *Attorney, Agent, or Firm* — Christensen O'Connor Johnson Kindness PLLC

(57) ABSTRACT

A torque link assembly for a landing gear includes a lower torque link and an upper torque link that releasably engage first and second quick release pin assemblies. The pin assemblies each include a housing attached to one of the torque links, and a locking pin member extending through the housing. The locking pin member includes a rod portion and a pin portion, and is slidable between an engaged position and a disengaged position for hingedly connecting/disconnecting the torque links. One of the housing and the locking pin member includes a channel having a longitudinal portion and a circumferential portion, and the other has a guide pin that engages the channel. The guide pin is in the longitudinal portion of the channel when moving between the engaged and disengaged positions, and is retained in the disengaged position when the guide pin is in the circumferential portion of the channel.

16 Claims, 9 Drawing Sheets

(51) Int. Cl.
  *B64C 25/14*  (2006.01)
  *B64C 25/26*  (2006.01)
  *F16C 11/02*  (2006.01)
  *B64C 25/00*  (2006.01)
  *F16B 21/00*  (2006.01)
  *F16C 11/04*  (2006.01)

(52) U.S. Cl.
  CPC ... *F16C 2326/43* (2013.01); *Y10T 403/32918* (2015.01); *Y10T 403/599* (2015.01)

(56) References Cited

U.S. PATENT DOCUMENTS

| | | | |
|---|---|---|---|
| 2,499,619 A | 3/1950 | Wood | |
| 3,348,869 A * | 10/1967 | Zern | A47G 25/902 294/3.6 |
| 3,397,000 A * | 8/1968 | Nakanishi | E05B 65/0864 292/61 |
| 4,132,376 A | 1/1979 | Sharples | |
| 4,184,783 A * | 1/1980 | Hall | F16B 21/18 403/157 |
| 4,661,009 A * | 4/1987 | Tripp | B24B 45/006 279/157 |
| 5,807,007 A | 9/1998 | Stemper | |
| 6,299,223 B1 * | 10/2001 | Ji | E05C 5/02 292/175 |
| 6,379,076 B1 * | 4/2002 | Reinhold | F16B 21/04 403/348 |
| 8,454,261 B2 * | 6/2013 | Horst | B61D 37/003 403/321 |
| 8,690,180 B1 | 4/2014 | Baade et al. | |
| 9,120,566 B2 | 9/2015 | O'Connell | |
| 2011/0239439 A1 * | 10/2011 | Maxwell | F16B 21/16 29/525.02 |
| 2012/0132742 A1 | 5/2012 | O'Connell | |

* cited by examiner

TORQUE LINK APEX QUICK RELEASE LOCKING MECHANISM

BACKGROUND

Aircraft operating on the ground typically do not move under their own power, but rather may be towed or pushed from one location to another with a towing tractor. For example, a towing tractor may use a tow bar that is configured to attach to the axle of the nose wheel assembly, or a towing platform or adaptor without a tow bar. Ground movement may include moving the aircraft between gates, pulling the aircraft into or out of a particular gate, or moving the aircraft to a servicing location.

Deployable shock-absorbing struts, or shock struts, convert the kinetic energy to cushion landing impacts or bump perturbations and dampen repeat oscillations as well as the tendency for an aircraft to rebound or "bounce." An oleo strut may be mixed or separated, and single-stage or multiple-stage, for example. Other types of shock struts exist, but are not commonly used in the current state of the art. An exemplary strut for landing gear is disclosed in U.S. Pat. No. 2,279,447 to Cowey, which is hereby incorporated by reference in its entirety.

A lower portion of a prior art aircraft landing gear 100 is illustrated in isolation in FIG. 1. The landing gear 100 includes a main shock absorbing strut or shock absorber 110 having a lower end 101 attached to an axle 102 mounting two wheels 93, and configured to be retractably attached to an airframe (not shown). For example, the shock absorber 110 may have a hybrid pneumatic and hydraulic function, sometimes referred to as an oleo strut (or oleo pneumatic strut). The oleo strut includes a piston 104 operatively coupled to the axle 102 and a cylinder 106 that slidably receives the piston 104 and is operatively coupled to the airframe.

The piston 104 and cylinder 106 are connected with a conventional scissors or torque link assembly 94 having an upper torque link 91 that is typically attached to the shock cylinder 106 and a lower torque link 92 that is typically attached to the shock piston 104, and wherein the ends of the upper and lower torque links 91, 92 are pivotably connected to accommodate the motion of the shock absorber 110.

Commercial aircraft operating on the ground are typically unable to move under their own power, and therefore need to be towed or pushed while on the ground, for example using a towing tractor with a tow bar that attaches to the axle 102 of the nose wheel assembly, or using a tractor with a towing platform. In conventional aircraft at least two persons are needed to accomplish the towing operations (including aircraft push-back from the gate) because the pivotal connections of the upper and lower torque links 91, 92 are disconnected prior to towing. Disconnecting the upper torque link 91 from the lower torque link 92 allows the nose wheel to assemble to free castor about the vertical axis, and therefore avoids undesirable loads on the steering system.

In prior art, torque assemblies 94 disconnecting the torque links 91, 92 require pulling apart or separating two oppositely-disposed apex pins (not shown) that connect the upper torque link 91 to the lower torque link 92. The apex pins are biased to the engaged position with a spring. Two hands are therefore required to separate the apex pins. A third hand is required to then separate the upper and lower torque links 91, 92. Similarly, when reassembling the links 91, 92, two hands are required to hold the pins in the disengaged position, and one (or two) additional hands are then required to align the torque links 91, 92 for re-insertion of the apex pins.

It would be beneficial if a torque link assembly for an aircraft landing gear could be disconnected, and re-connected, by a single individual.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A torque link assembly for an aircraft landing gear, for example a nose gear, includes a toque link assembly having a lower torque link and an upper torque link. The first end of the lower torque link may pivotably engage a landing gear and a second end defines a first link portion. The upper torque link may have a first end configured to pivotably engage the landing gear and a second end defining a second link portion. First and second locking pin assemblies releasably and hingedly connect the first link portion of the upper torque link to the second link portion of the lower torque link. Each locking pin assembly includes a housing attached to one of the lower torque link and the upper torque link. A locking pin member, including a rod portion that extends through the housing and a pin portion that inserts into an aperture in the first link portion and through an aperture in the second link portion to connect the torque links. A biasing element biases the locking pin member towards engagement with the second link portion. The locking pin member is slidable between an engaged position wherein the pin portion connects the lower torque link to the upper torque link, and a disengaged position wherein the pin portion does not connect the lower torque link to the upper torque link. One of the housing and the locking pin member further includes a continuous channel with a longitudinal portion and a circumferential portion, and the other of the housing and the locking pin member further includes a guide pin that engages the channel such that the locking pin member is movable between the engaged position and the disengaged position when the guide pin is in the longitudinal portion of the channel and is retained in the disengaged position when the guide pin is in the circumferential portion of the channel.

In an embodiment the locking pin member includes the channel and the housing includes the guide pin. In another embodiment the housing includes the channel, and the locking pin member includes guide pin.

In an embodiment the housing includes a housing body and an end receiver, wherein the housing body slidably engages the rod portion of the locking pin member and the end receiver receives an end of the housing body.

In an embodiment the first and second locking pin assemblies each further include a handle that is connected to a distal end of the rod portion of the locking pin member. For example, the handle may be a T-shaped handle connected to a distal end of the rod portion of the locking pin member.

In an embodiment a first bearing sleeve extends through the aperture in the first link member and a second bearing sleeve that extends through an aperture in the second link member, and the pin portion of the locking pin member is configured to be inserted through the first and second bearing sleeves. For example, the first and second bearing sleeves each comprise a tubular portion and a flange.

A locking pin assembly for a torque link assembly having a lower torque link having a first end configured to pivotably engage a landing gear and a second end having a first link portion and an upper torque link having a first end configured to pivotably engage the landing gear and a second end having a second link portion, the locking pin assembly includes a housing, a locking pin member, and a biasing element. The housing is configured to be attached to one of the lower torque link and the upper torque link. The locking pin member includes a rod portion extending through the housing and a pin portion configured to be inserted into an aperture in the first link portion and through an aperture in the second link portion to hingedly connect the lower torque link with the upper torque link. The biasing element biases the locking pin member towards the second link portion. And the locking pin member is slidable between an engaged position wherein the pin portion hingedly connects the lower torque link to the upper torque link, and a disengaged position wherein the pin portion does not connect the lower torque link to the upper torque link. One of the housing and the locking pin member further comprises a continuous channel comprising a longitudinal portion and a circumferential portion, and the other of the housing and the locking pin member further comprises a guide pin that engages the channel such that the locking pin member is movable between the engaged position and the disengaged position when the guide pin is in the longitudinal portion of the channel and is retained in the disengaged position when the guide pin is in the circumferential portion of the channel.

In an embodiment the locking pin member comprises the channel and the housing comprises the guide pin. In another embodiment the housing comprises the channel and the locking pin member comprises the guide pin.

In an embodiment the housing comprises a housing body and an end receiver, wherein the housing body slidably engages the rod portion of the locking pin member and the end receiver that receives an end of the housing body.

In an embodiment the first and second locking pin assemblies each further comprise a handle the is connected to a distal end of the rod portion of the locking pin member. For example the handle may be a T-shaped handle connected to a distal end of the rod portion of the locking pin member.

In an embodiment a first bearing sleeve that extends through the aperture in the first link member and a second bearing sleeve that extends through an aperture in the second link member, and wherein the pin portion of the locking pin member is configured to be inserted through the first and second bearing sleeves. For example, the first and second bearing sleeves each comprising a tubular portion and a flange.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
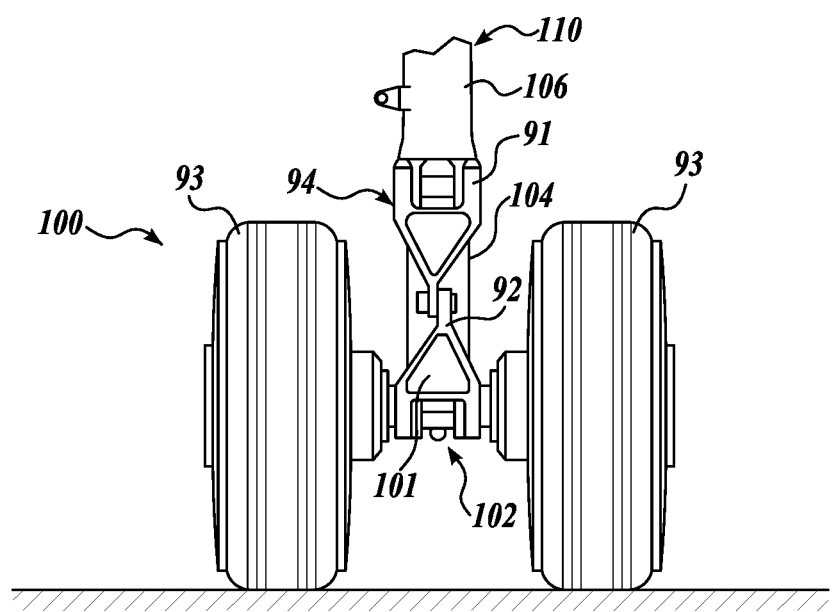
FIG. 1 shows a prior art landing gear having a torque link assembly connecting the shock cylinder with the shock piston.
Figure 2:
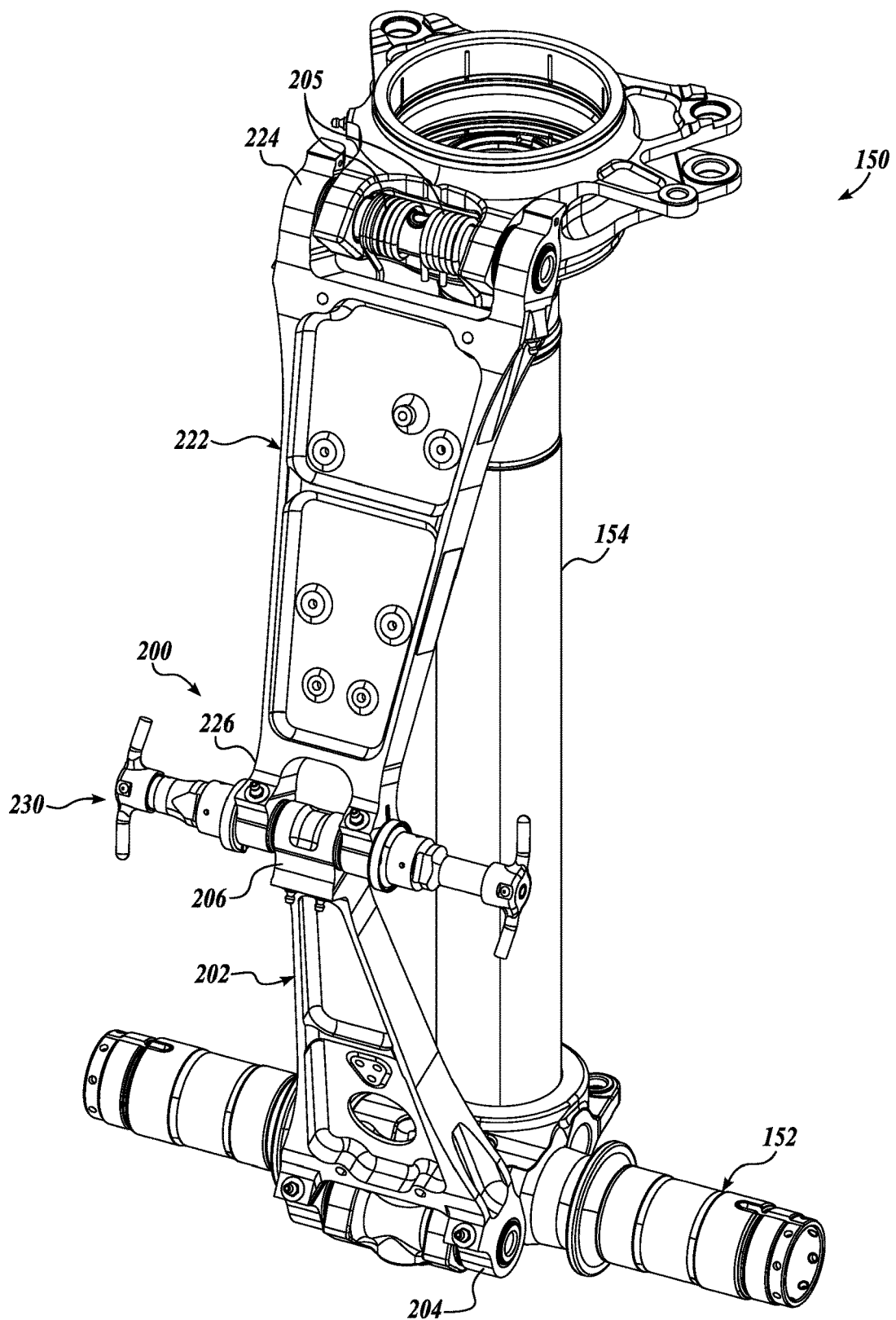
FIG. 2 is a perspective view of portions of a shock strut having a torque link assembly with a quick release locking mechanism in accordance with the present invention.

A perspective view showing portions of a shock strut 150 with a torque link assembly 200 in accordance with the present invention is shown in FIG. 2. The torque link assembly 200 in this embodiment includes a lower torque link 202 having a first end 204 with a hinged connection to an axle assembly 152. The axle assembly 152 is attached to a piston 154 of a shock absorber. The torque link assembly 200 further includes an upper torque link 222 having a first end 224 with a hinged connection to a cylinder (not shown) of the shock absorber. A second end 206 of the lower torque link 202 is hingedly connected to a second end 226 of the upper torque link 222 with a locking quick release pin assembly 230, as described in more detail below. Optionally, the upper torque link 222 and/or the lower torque link 202 may include one or more biasing members 205 that urge the torque links 202, 222 away from the piston 154. For example, the torque links 202, 222 may be spring loaded such that the second ends 206, 226 are biased away from each other when the quick release pin assembly 230 is moved to a disengaged position, and remain apart until they are manually reengaged.

Figure 3:
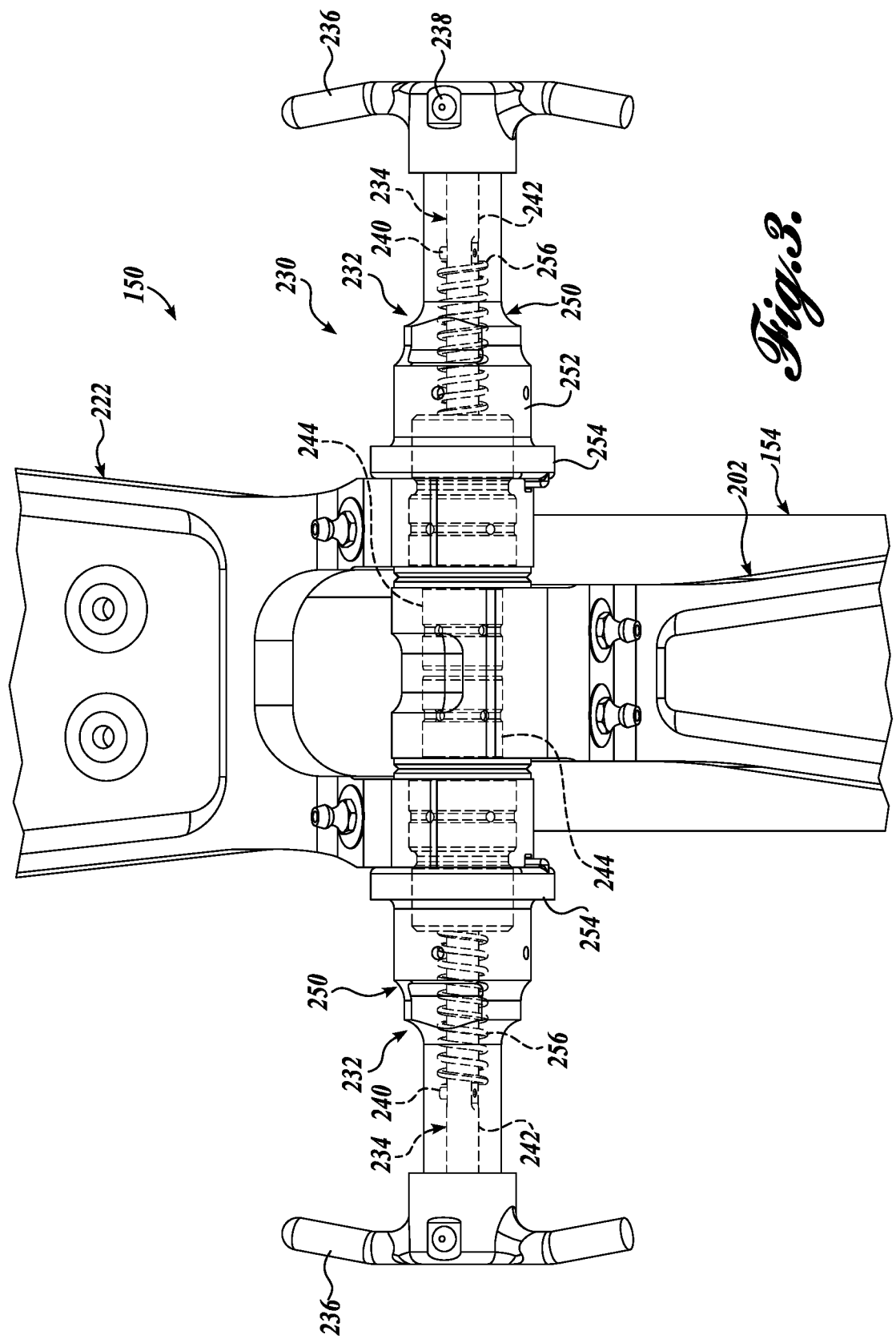
FIG. 3 is a front view showing the quick release locking mechanism of the shock strut shown in FIG. 2, wherein the quick release locking mechanism is in an engaged position.
Figure 4:
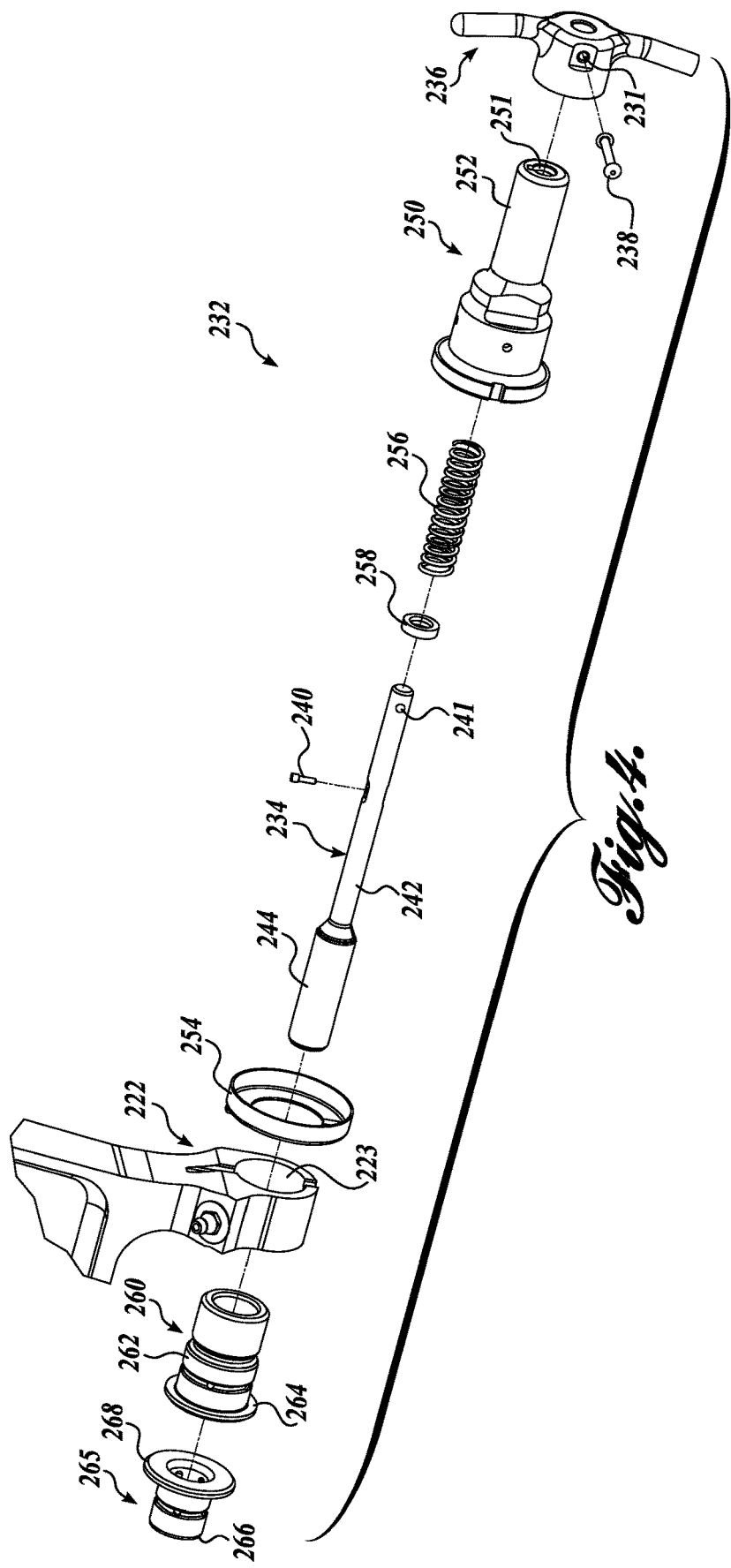
FIG. 4 is an exploded view of the pin assembly for one side of the quick release locking mechanism shown in FIG. 3, which is substantially the same in mirror symmetry to the other pin assembly shown in FIG. 3.

FIG. 3 is a front view of a portion of the torque link assembly 150 (with internal components indicated in phantom line), showing the quick release pin assembly 230 in the engaged position. The quick release pin assembly 230 includes a pin assembly 232 including a locking pin member 234 (shown in phantom) on one side of the quick release pin assembly 230 and a second pin assembly 232 including a locking pin member 234 on an opposite side of the quick release pin assembly 230. Refer also to FIG. 4, which shows the pin assembly 232 in exploded view.

The pin assembly 232 includes a handle 236, for example a T-handle that is connected to the locking pin member 234. Although a T-handle is shown in the currently preferred embodiment shown in the FIGURES, other handle shapes may be used and are contemplated by the present inventing, including knobs or the like. The locking pin member 234 has a rod portion 242 that is connected at one end to the handle 236, and a pin portion 244 that engages the upper and lower torque links 202, 222. The handle 236 is connected to the locking pin member 234 with a through connector 238 that extends through corresponding apertures 231, 241 in the handle 236 and rod portion 242 respectively. A guide pin 240 is fixed to, and extends outwardly from, the rod portion 242. A housing 250, comprising a housing body 252 and an end receiver 254, defines a center aperture 251 extending from the handle 236 and slidably receives the rod portion 242 of the locking pin member 234. An annular stop 258 slidably engages the rod portion 242 and abuts the pin portion 244 of the locking pin member 234. A biasing member 256, for example a coil spring, is disposed in the housing body 252 and abuts the annular stop 258. The biasing member 256 biases the locking pin member 234 inwardly toward an engaged position wherein the locking pin member 234 hingedly connects the lower and upper torque links, engaging corresponding apertures in both the lower torque link 202 and the upper torque link 222.

Figure 5:
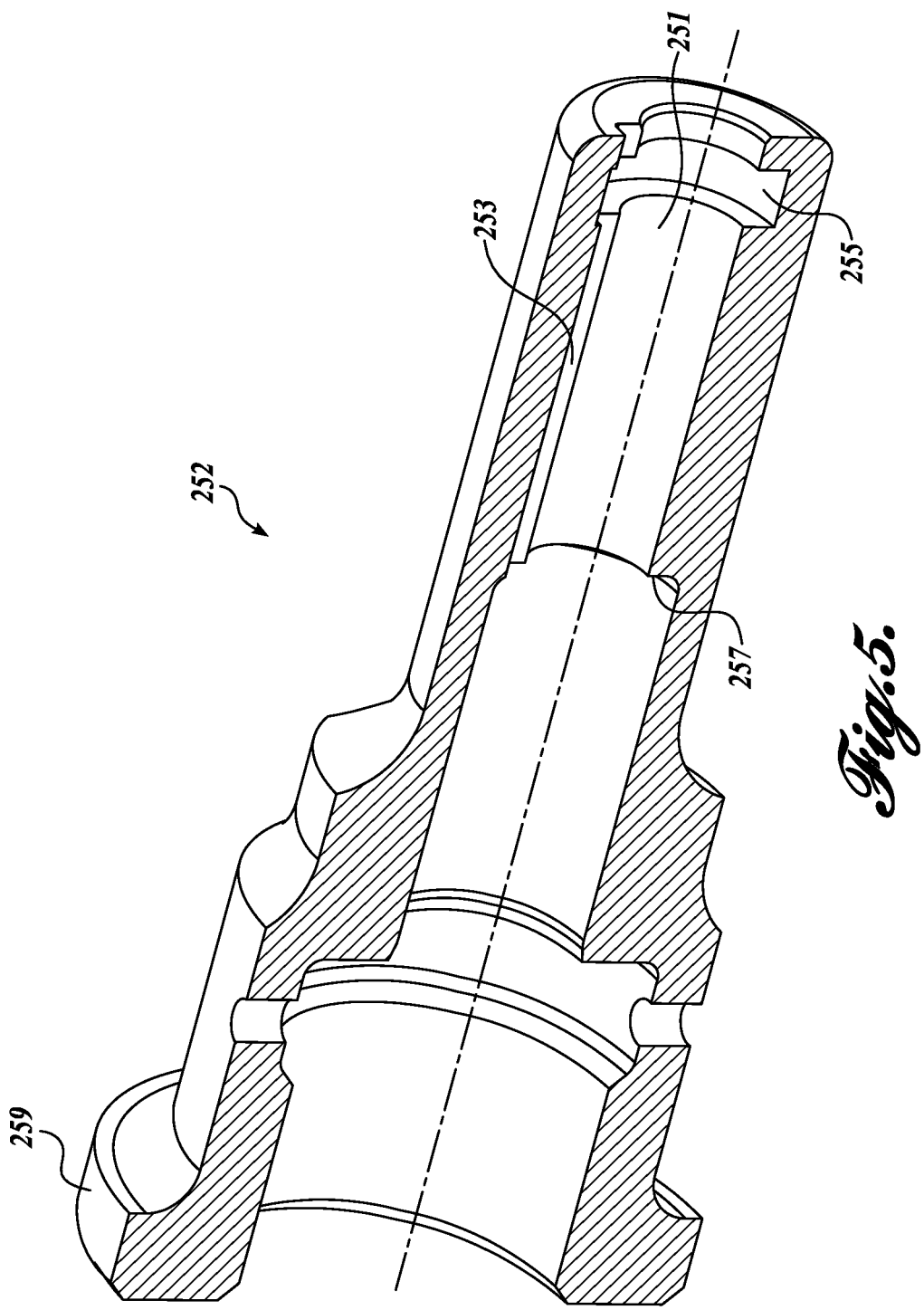
FIG. 5 is a sectional view of the housing body for the pin assembly shown in FIG. 4.

Refer now also to FIG. 5, illustrating a sectional view of the housing body 252. The housing body 252 includes the center aperture 251 that is sized and configured to slidably receive the rod portion 242 of the locking pin member 234. The housing body 252 includes a guide channel having a longitudinal portion 253 and a circumferential portion 255. In particular, the longitudinal channel 253 extends along a portion of the center aperture 251, and is sized and positioned to slidably receive the guide pin 240 extending from the rod portion 242. The longitudinal channel 253 intersects the circumferential channel 255, which is also sized and positioned to slidably receive the guide pin 240. Although the circumferential channel 255 in the present embodiment extends three hundred sixty degrees around the center aperture 251, in an alternative embodiment the circumferential channel extends only partially around the center aperture 251. The housing body 252 also defines an annular abutment 257 that is positioned to engage one end of the biasing member 256. A flanged end 259 of the housing body 252 is configured to be received into the annular end receiver 254 of the housing 250.

Figure 6:
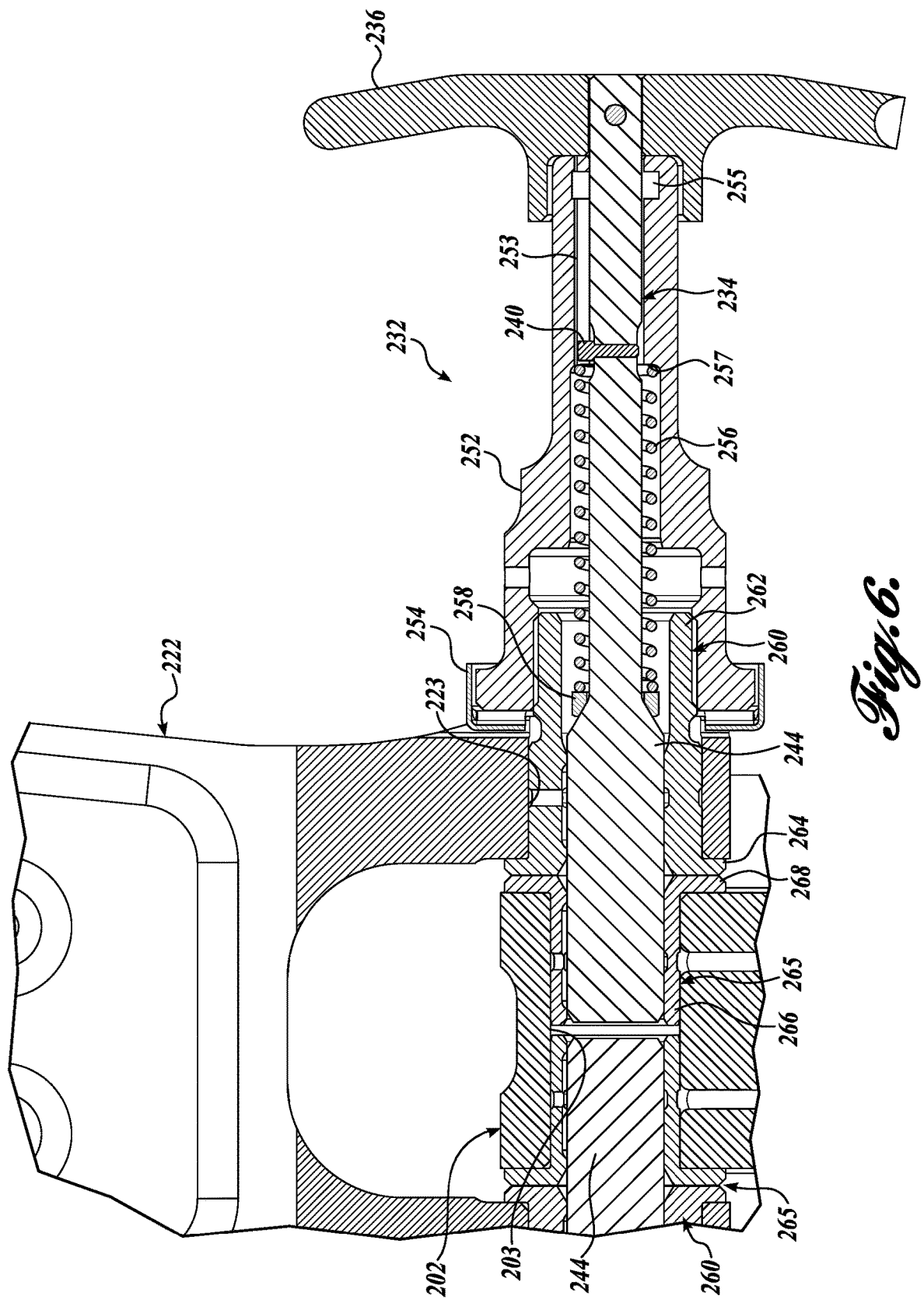
FIG. 6 is a sectional view of the pin assembly shown in FIG. 4 in the engaged position connecting the torque links.

Refer now also to FIG. 6, showing a sectional view of the pin assembly 232 in the engaged position. The pin portion 244 of the locking pin member 234 slidably engages a bearing assembly comprising a first sleeve fitting 260 and a second sleeve fitting 265. The first sleeve fitting 260 has a tubular portion 262 that extends through an aperture 223 in the upper torque link 222, and a flange portion 264 that abuts the upper torque link 222. The second sleeve fitting 265 has a tubular portion 266 that extends through an aperture 203 in the lower torque link 202 and a flange portion 268 that abuts the flange portion 264 of the first sleeve fitting 260 and the lower torque link 202.

In a current embodiment, the tubular portion 262 of the first sleeve fitting 260 slidably and closely engages the aperture 223 in the upper torque link 222 such that the flange portion 264 abuts the upper link 222, and the tubular portion 262 is configured to engage the housing body 252 in an interference fit. For example the housing body 252 may be heated prior to receiving or being pressed on to the tubular portion 262 such that upon cooling the housing body 252 is firmly secured to the first sleeve fitting 260. An end of the housing body 252 is received into the end receiver 254. Alternatively, the housing body 252 may threadably engage the tubular portion 262 of the first sleeve fitting 260.

As discussed above, the locking pin member 234 of the assembly 232 is biased by the biasing member 256 towards the engaged position shown in FIG. 6, wherein the pin portion 244 engages both the lower torque link 202 and the upper torque link 222 through the first and second sleeve fittings 260, 265. The upper and lower links 202, 222 are thereby engaged to hinge about the pin portions 244.

Figure 7:
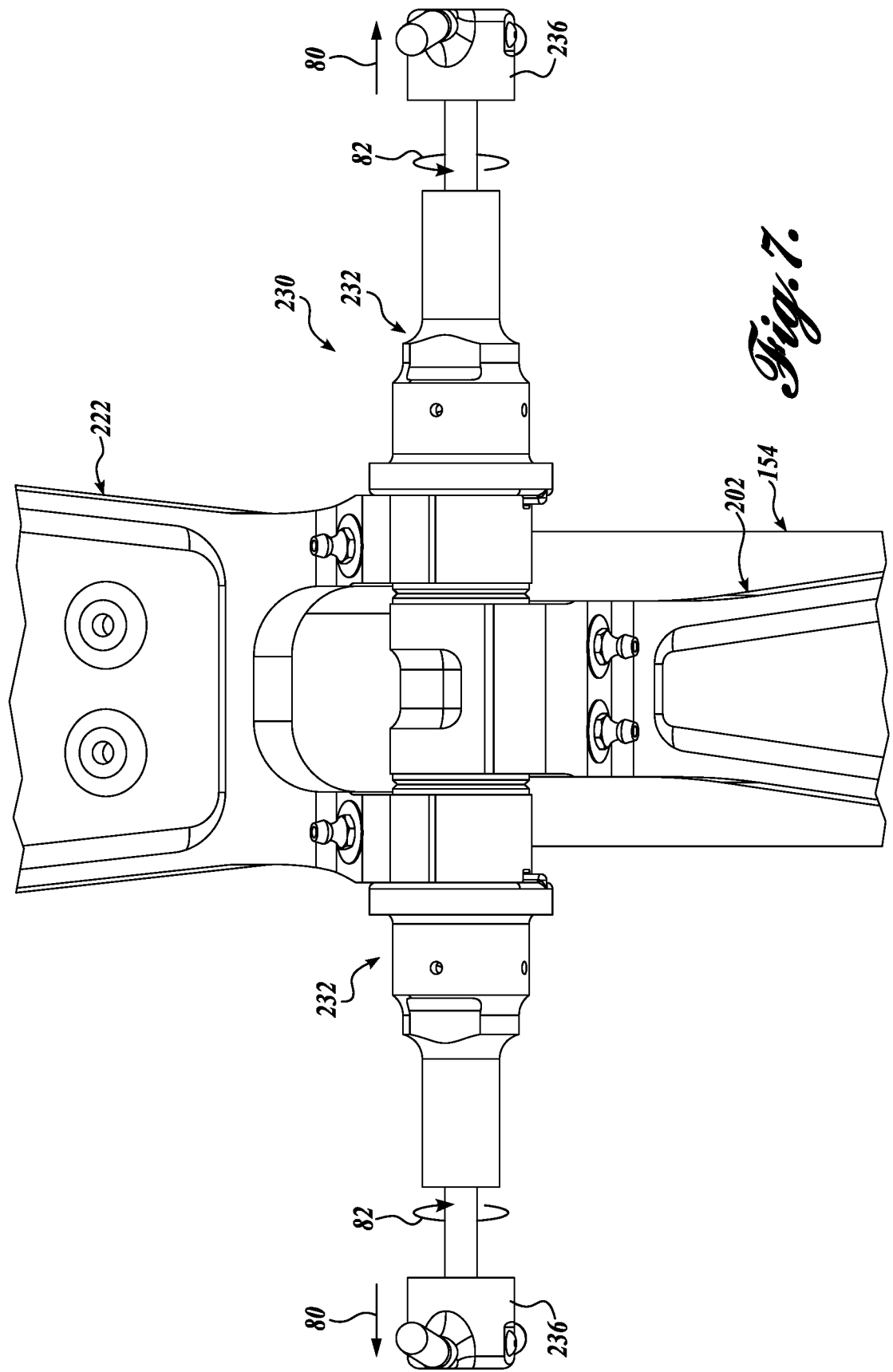
FIG. 7 is a front view showing the quick release locking mechanism in FIG. 2, in a disengaged position.

As indicated by arrows 80 and 82 in FIG. 7, to disengage the locking pin member 234 a user pulls the corresponding handle 236 outwardly away from the torque links (arrows 80) against the biasing force of the corresponding spring 256 to a disengaged position. As the guide pin 240 slides along the longitudinal channel 253, the corresponding pin portion 244 of the locking pin member 234 exits the second sleeve fitting 265, disengaging from the lower torque link 202. When the guide pin 240 reaches the circumferential channel 255, the user turns the handle 236 (arrows 82) such that the guide pin 240 is offset from the longitudinal channel 253, retaining the locking pin member 234 in the disengaged position. When the guide pin 240 is located in the circumferential channel 255, the pin portion 244 of the locking pin member 234 is fully disengaged from the lower torque link 202 second sleeve fitting 265. Therefore, when the guide pins 240 of both pin assemblies 232 are located in their respective circumferential channels 255, the lower torque link 202 is disengaged from the upper link 222.

Therefore, one person can readily disengage the torque link assembly 230 by pulling one of the handles 236 outwardly to disengage one pin assembly 232 and rotating the handle 236 to retain the assembly 232 in the disengaged position, and simultaneously or sequentially disengaging the other pin assembly 232. If the torque links 202, 222 are biased to separate, for example with one or more biasing members 205 (FIG. 2), the torque links 202, 222 may move apart without further assistance. If needed, the user may manually separate the torque links 202, 222.

To reassemble the torque links 202, 222 in the engaged position, the user aligns the torque links 202, 222 and may manually hold them in position while rotating the handle 236 for the pin assembly 232 on one side to align the guide pin 240 with the corresponding longitudinal channel 253. The biasing member 256 then urges the locking pin member 234 inwardly to insert the pin portion 244 into the second sleeve fitting 265. The opposite handle 236 may then be similarly rotated and moved to the engaged position.

Figure 8:
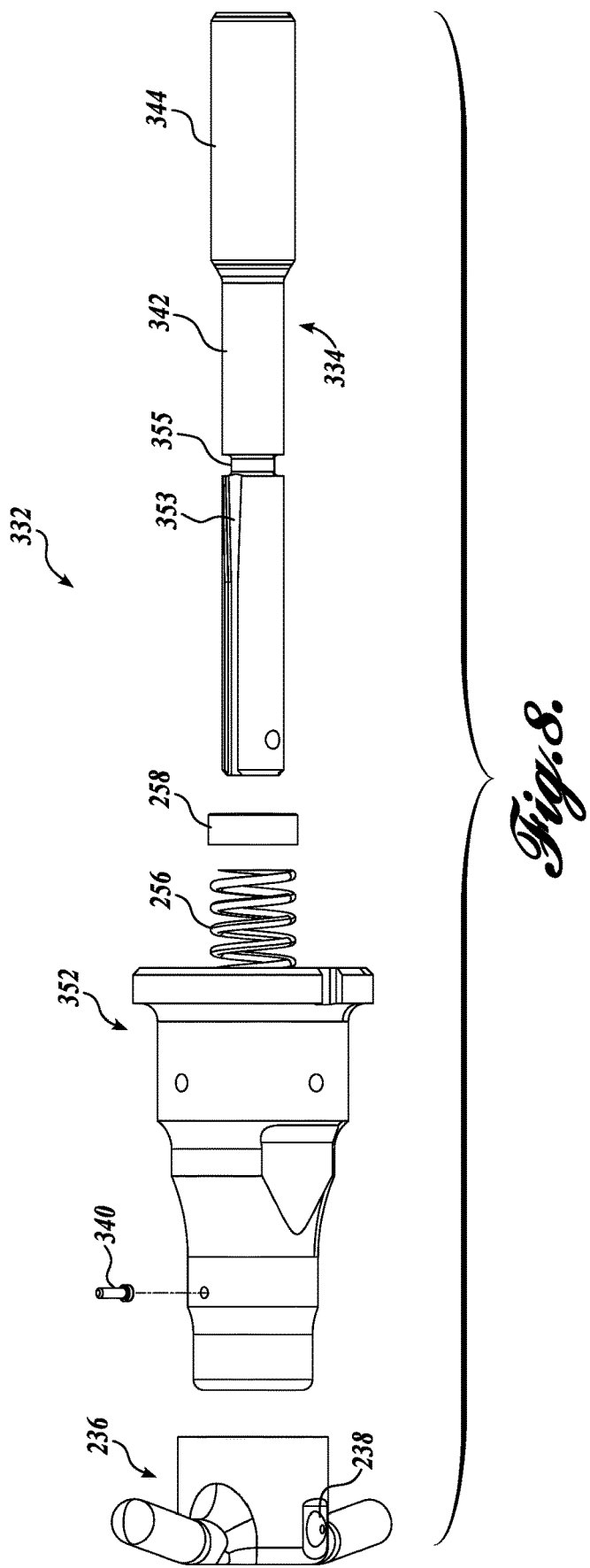
FIG. 8 is a partially exploded view of a pin assembly for another embodiment of a quick release locking mechanism in accordance with the present invention.

An alternative embodiment of a locking pin assembly 332 is illustrated in partially exploded view in FIG. 8. This embodiment is similar to the pin assembly 232 described above, except as discussed below. Aspects of the locking pin assembly 332 that are the same or similar to the pin assembly 232 shown in FIG. 4 will not be repeated, for brevity and clarity.

Figure 9:
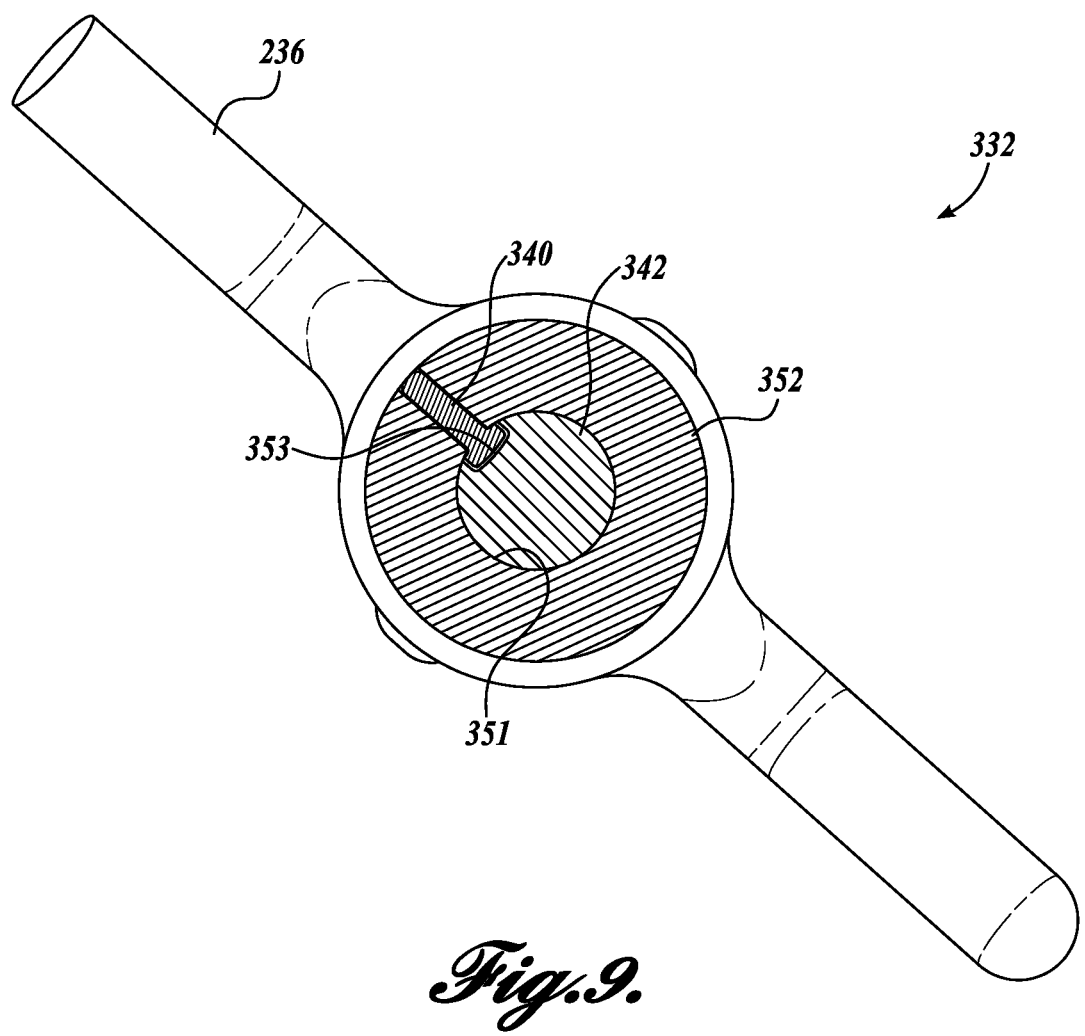
FIG. 9 is a transverse sectional view of the pin assembly shown in FIG. 8 through the guide pin of the assembly.

In this embodiment a guide pin 340 is fixed to, and extends inwardly into, the central aperture 351 of the housing body 352 (see, FIG. 9). A locking pin member 334 having a rod portion 342 and a pin portion 344 is slidably received into the housing body 352. The pin portion 344 is configured to hingedly link the lower torque link 202 to the upper torque links 222, as discussed above. In this embodiment, the rod portion 342 of the locking pin member 334 includes a guide channel comprising a longitudinal channel 353 and an intersecting circumferential channel 355. Referring also to the sectional view shown in FIG. 9, the guide pin 340 extending into the housing body 352 is positioned to slidably engage the longitudinal channel 353 when the locking pin assembly 332 is in the engaged position. While the guide pin 340 engages the longitudinal channel 353, the assembly including the handle 236 and locking pin member 334 is prevented from rotating about its axis. The circumferential channel 355 is sized and positioned to slidably receive the guide pin 340. When the handle 236 and locking pin member 334 are pulled outward sufficiently to align the guide pin 340 with the circumferential channel 355, the pin portion 344 of the locking pin member 334 is disengaged from the lower torque link 202. The handle 236 and locking pin member 334 may be rotated such that the guide pin 340 engages the circumferential channel 355, and is thereby retained in the disengaged position.

Therefore, to disengage the pin portion 344 from locking engagement with the torque link 202, the user pulls the handle 236 outwardly (as illustrated by arrows 80 in FIG. 7)

until the guide pin 340 enters and abuts the circumferential channel 355, and turns the handles 236 (as illustrated by arrows 82 in FIG. 7) to lock the pin assemblies 332 in the disengaged position. To re-engage the torque links 202, 220, the user aligns the torque links 202, 220 to align the corresponding pin apertures, and turns the handles 236 such that the guide pin 340 aligns with the longitudinal slot 353. The biasing member 256 is configured to urge the locking pin member 334 into the engaged position.

While illustrative embodiments have been illustrated and described, it will be appreciated that various changes can be made therein without departing from the spirit and scope of the invention.

The embodiments of the invention in which an exclusive property or privilege is claimed are defined as follows:

1. A torque link assembly comprising:
 a lower torque link having a first end configured to pivotably engage a landing gear and a second end having a first link portion;
 an upper torque link having a first end configured to pivotably engage the landing gear and a second end having a second link portion;
 first and second locking pin assemblies, each locking pin assembly comprising:
 a housing configured to be attached to one of the lower torque link and the upper torque link;
 a locking pin member comprising a rod portion extending through the housing and a pin portion configured to be inserted into an aperture in the first link portion and through an aperture in the second link portion to hingedly connect the lower torque link with the upper torque link; and
 a biasing element configured to bias the locking pin member towards the second link portion;
 wherein the locking pin member is slidable between an engaged position wherein the pin portion hingedly connects the lower torque link to the upper torque link, and a disengaged position wherein the pin portion does not connect the lower torque link to the upper torque link; and
 wherein one of the housing and the locking pin member further comprises a continuous channel comprising a longitudinal portion extending parallel to an axis of the housing and the locking pin and an annular circumferential portion disposed at an end of the longitudinal portion, and the other of the housing and the locking pin member further comprises a guide pin that engages the channel such that the locking pin member is movable between the engaged position and the disengaged position when the guide pin is in the longitudinal portion of the channel and is retained in the disengaged position when the guide pin is in the circumferential portion of the channel, engagement of the guide pin with the longitudinal portion of the channel preventing rotation of the locking pin member relative to the housing.

2. The torque link assembly of claim 1, wherein the locking pin member comprises the channel and the housing comprises the guide pin.

3. The torque link assembly of claim 1, wherein the housing comprises the channel and the locking pin member comprises the guide pin.

4. The torque link assembly of claim 1, wherein the housing comprises a housing body and an end receiver, wherein the housing body slidably engages the rod portion of the locking pin member and the end receiver that receives an end of the housing body.

5. The torque link assembly of claim 1, wherein the first and second locking pin assemblies each further comprise a handle that is connected to a distal end of the rod portion of the locking pin member.

6. The torque link assembly of claim 5, wherein the handle is a T-shaped handle connected to a distal end of the rod portion of the locking pin member.

7. The torque link assembly of claim 1, further comprising a first bearing sleeve that extends through the aperture in the first link member and a second bearing sleeve that extends through an aperture in the second link member, and wherein the pin portion of the locking pin member is configured to be inserted through the first and second bearing sleeves.

8. The torque link assembly of claim 7, wherein the first and second bearing sleeves each comprise a tubular portion and a flange.

9. A locking pin assembly for a torque link assembly having a lower torque link having a first end configured to pivotably engage a landing gear and a second end having a first link portion and an upper torque link having a first end configured to pivotably engage the landing gear and a second end having a second link portion, the locking pin assembly comprising:
 a housing configured to be attached to one of the lower torque link and the upper torque link;
 a locking pin member comprising a rod portion extending through the housing and a pin portion configured to be inserted into an aperture in the first link portion and through an aperture in the second link portion to hingedly connect the lower torque link with the upper torque link; and
 a biasing element configured to bias the locking pin member towards the second link portion;
 wherein the locking pin member is slidable between an engaged position wherein the pin portion hingedly connects the lower torque link to the upper torque link, and a disengaged position wherein the pin portion does not connect the lower torque link to the upper torque link; and
 wherein one of the housing and the locking pin member further comprises a continuous channel comprising a longitudinal portion extending parallel to an axis of the housing and the locking pin and an annular circumferential portion disposed at an end of the longitudinal portion, and the other of the housing and the locking pin member further comprises a guide pin that engages the channel such that the locking pin member is movable between the engaged position and the disengaged position when the guide pin is in the longitudinal portion of the channel and is retained in the disengaged position when the guide pin is in the circumferential portion of the channel, engagement of the guide pin with the circumferential portion of the channel preventing translation of the locking pin member relative to the housing when the locking pin is rotated while in the disengaged position.

10. The locking pin assembly of claim 9, wherein the locking pin member comprises the channel and the housing comprises the guide pin.

11. The locking pin assembly of claim 9, wherein the housing comprises the channel and the locking pin member comprises the guide pin.

12. The locking pin assembly of claim 9, wherein the housing comprises a housing body and an end receiver, wherein the housing body slidably engages the rod portion of the locking pin member and the end receiver that receives an end of the housing body.

13. The locking pin assembly of claim 9, wherein the first and second locking pin assemblies each further comprise a handle that is connected to a distal end of the rod portion of the locking pin member.

14. The locking pin assembly of claim 13, wherein the handle is a T-shaped handle connected to a distal end of the rod portion of the locking pin member.

15. The locking pin assembly of claim 9, further comprising a first bearing sleeve that extends through the aperture in the first link member and a second bearing sleeve that extends through an aperture in the second link member, and wherein the pin portion of the locking pin member is configured to be inserted through the first and second bearing sleeves.

16. The locking pin assembly of claim 15, wherein the first and second bearing sleeves each comprising a tubular portion and a flange.

\* \* \* \* \*